Figure 1:
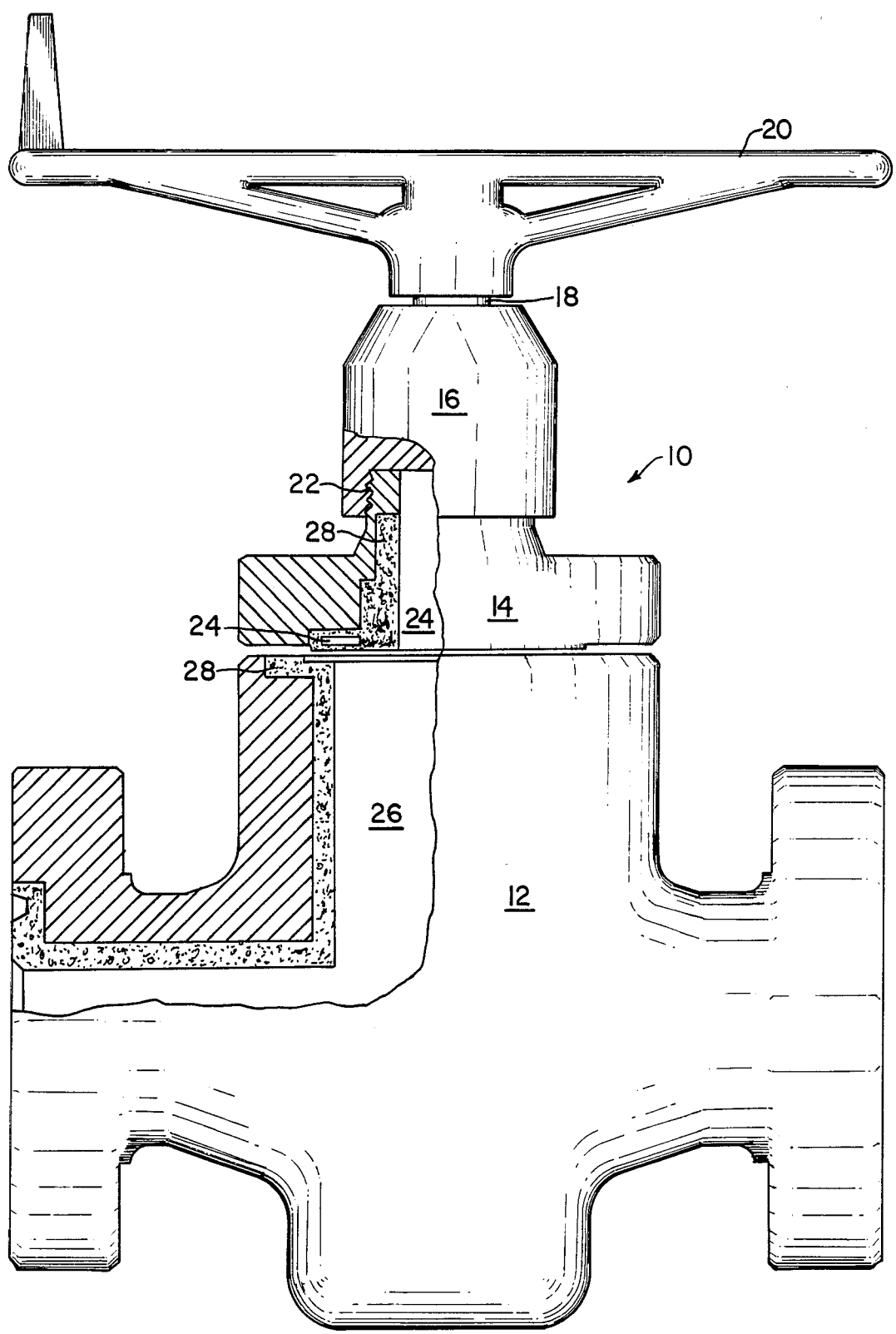

United States Patent [19]

McCollough et al.

[11] Patent Number: 4,544,523
[45] Date of Patent: Oct. 1, 1985

[54] CLADDING METHOD FOR PRODUCING A LINED ALLOY ARTICLE

[75] Inventors: William L. McCollough, Gibsonia; Frank J. Wulczynski, Elizabeth, both of Pa.

[73] Assignee: Crucible Materials Corporation, Pittsburgh, Pa.

[21] Appl. No.: 542,877

[22] Filed: Oct. 17, 1983

[51] Int. Cl.$^4$ .............................................. B21D 53/00
[52] U.S. Cl. ........................................ 419/8; 419/49; 419/60; 428/554; 425/405 H; 29/156.7 R; 29/DIG. 31; 138/140; 138/143; 148/11.5 P; 148/11.5 Q
[58] Field of Search ............... 419/8, 49, 60; 428/554; 425/405 H; 29/156.7 R, 157.1 R, DIG. 31; 138/140, 143, DIG. 6; 148/11.5 P, 11.5 Q; 228/215

[56] References Cited

U.S. PATENT DOCUMENTS

| | | | |
|---|---|---|---|
| 3,499,066 | 3/1970 | Murray | 425/405 H |
| 3,552,938 | 1/1971 | Draca | 428/554 |
| 4,016,008 | 4/1977 | Forbes Jones et al. | 148/11.5 P X |
| 4,017,576 | 4/1977 | Freed et al. | 264/517 |
| 4,065,302 | 12/1977 | Turillon | 419/8 |
| 4,477,955 | 10/1984 | Becker et al. | 419/8 X |

Primary Examiner—Joseph L. Schofer
Assistant Examiner—Fred M. Teskin
Attorney, Agent, or Firm—Clair X. Mullen, Jr.

[57] ABSTRACT

A method for producing an alloy article, such as a valve or valve component, and an assembly for use therewith. The article is produced by hot isostatic compacting wherein a lining of prealloyed powdered metal of an alloy composition different than that of the remainder of the article is confined on a surface of an internal passage or cavity in the article. A solid lining element is provided contiguous with at least a portion of the powdered metal lining the surface of said internal passage, the lining element is of an alloy also different from that of the remainder of the article. The powdered metal and solid lining element are heated and then hot isostatically pressed to densify and bond the powdered metal and the lining element to the surface of the internal passage of the article to provide a clad lining of dissimilar metal.

3 Claims, 2 Drawing Figures

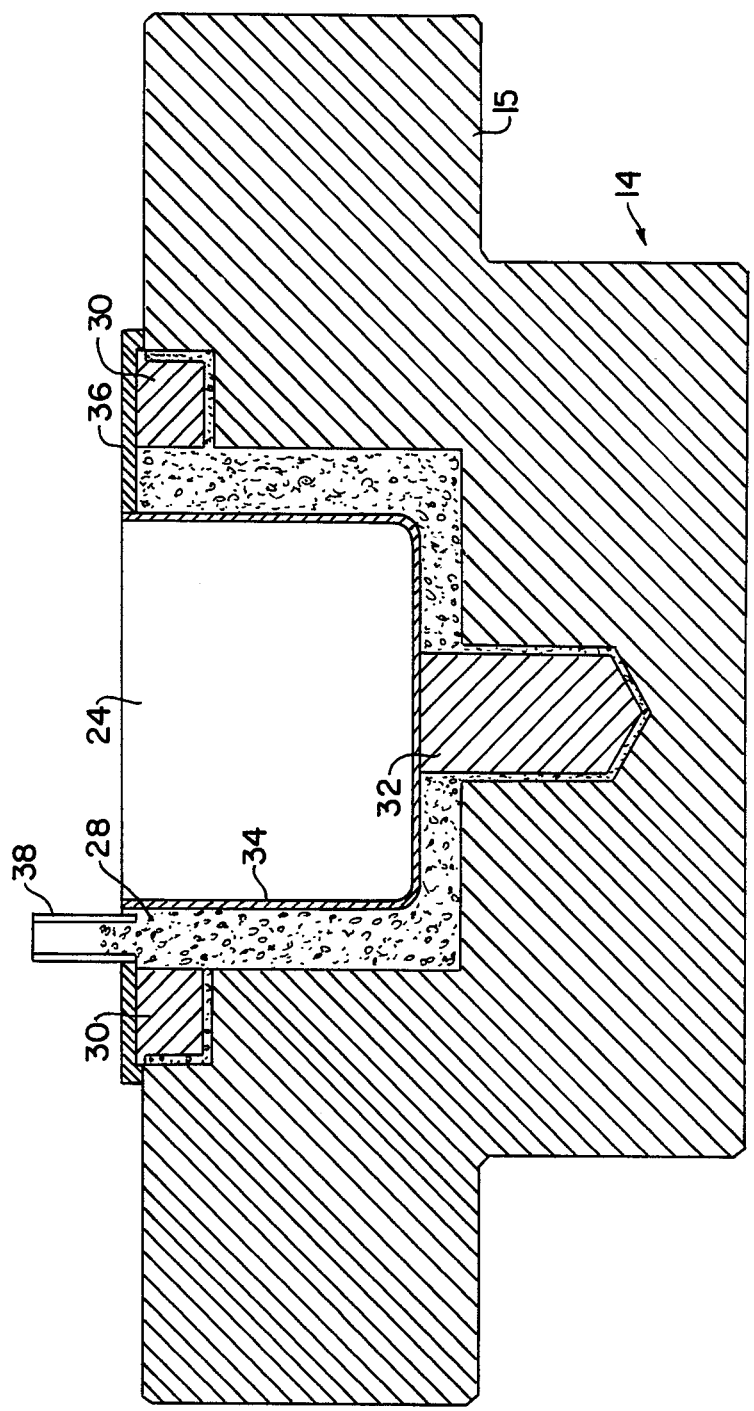

CLADDING METHOD FOR PRODUCING A LINED ALLOY ARTICLE

BACKGROUND OF THE INVENTION

In applications wherein fluids, such as gas and liquids, are transmitted through valves and the like, said fluids may be highly corrosive, such as would be the case with hydrogen sulfide gas. In such applications it is desirable that the internal passages of the valve exposed to the corrosive fluid exhibit resistance thereto. Conventional materials used for this purpose are nickel-base corrosion resistant alloys, such as UNS625 and UNSN-102-76. These alloys, however, are expensive and if the valve body is manufactured therefrom it adds considerably to the cost of installations where valves from these materials are required. To reduce the cost of valves and like components subjected to corrosive fluids in these applications, the portion of the valve interior that is exposed to the corrosive fluids may be clad with a corrosion-resistant alloy with the remainder of the valve being made from a less expensive alloy. This cladding may be produced by confining a lining of powdered metal over the passage or cavity surface of the valve which is to be clad and then hot isostatically compacting the powdered metal lining to densify the same and bond it to the surface to be clad. In these applications, however, it is necessary that close tolerances be maintained with respect to the internal dimensions of the passages and cavities. In article configurations wherein the cladding is required to be of relatively thick cross section, it is difficult to control the final thickness of such portions after hot isostatic compacting due to the deformation of the article surface in contact with the powder. Therefore, these portions of the cladding may vary out of tolerance with the remainder of the clad surfaces that are of relatively thinner cross section.

SUMMARY OF THE INVENTION

It is accordingly a primary object of the present invention to provide a method and an assembly for use therewith wherein cladding by hot isostatically compacting a powdered metal layer onto a surface of an internal passage or cavity of an article may be performed with a solid lining element being provided at cladding areas of relatively thicker cross section, wherein the solid lining element is bonded to the passage or cavity by powder interposed between it and the surface to be clad so that relatively less densification and thus relatively less shrinkage occurs so that the required tolerances may be more readily obtained after hot isostatic compacting.

This and other objects of the invention as well as a more complete understanding thereof may be obtained from the following description and drawings, in which:

FIG. 1 is an elevation view in partial cross section of one embodiment of a valve having valve components made in accordance with the practice of the invention; and FIG. 2 is a vertical cross section of an assembly for hot isostatic compacting in accordance with the invention of a valve component of the valve of FIG. 1.

Broadly in the practice of the invention an article such as a valve or valve component having an internal passage or cavity is provided. The passage or cavity is adapted in the conventional manner for the passage therethrough of a highly corrosive fluid, such as hydrogen sulfide or natural gas having a high hydrogen sulfide content. The internal passage is, of course, subject to the highly corrosive fluid and requires a cladding of an alloy resistant thereto. In accordance with the invention a lining of powdered metal is confined on the walls or surface of the internal passage. The powdered metal of the lining is of a metallurgical composition more resistant to corrosive fluids than the material from which the remainder of the article is constructed. At an area or areas wherein the configuration of the passage requires that the cladding be of relatively thick cross section, a solid lining element, generally of the same composition as the powdered metal lining is provided contiguous with the lining of powdered metal and with at least a portion of the powdered metal lining being between the wall or surface of the internal passage to be clad and the solid lining element. Generally, the lining element would be embedded within the powdered metal lining and in spaced apart relation from the passage surface. With the assembly so described the powdered metal lining and solid lining element would be heated to elevated temperature and the assembly hot isostatically compacted to densify the powdered metal lining to substantially full density and simultaneously bond the solid lining element to the passage surface. The compacted powdered metal lining and the solid lining element, therefore, constitute a clad surface over the walls of the passage. It is to be understood that with a single cladding operation of this type more than one lining element may be provided depending upon the configuration of the passage and specifically the number of areas of relatively thick cross section to be clad. Prior to heating, the powdered metal and lining element would be sealed against the atmosphere, as by the use of a sleeve inserted within the passage in spaced apart relation to the surface to be clad with the powdered metal and lining element therebetween. The space between the sleeve or other sealing means and the passage wall or surface is therefore filled with the powdered metal and lining element. This space is evacuated to subatmospheric pressure which operation is performed prior to heating to hot isostatic pressing temperature. The sleeve is generally of a material such as mild carbon steel which is readily deformable during the hot isostatic compacting operation.

The assembly for use in accordance with the invention would therefore constitute an alloy article, such as a valve or valve component which would have an internal passage or cavity to be clad. A lining of prealloyed powder metal would be provided on the surface of the passage with at least one solid lining element being contiguous with at least a portion of the lining of powdered metal at an area or areas of relatively thick cross sectional area. The solid lining element and powdered metal would be of a composition different from that of the remainder of the article and would be of an alloy that is resistant to the corrosive media to which the internal passage would be subjected during use. The assembly would likewise include a sleeve of mild carbon steel within the passage in spaced apart relation to the passage surface to be clad and adapted to seal the powdered metal and lining element against the atmosphere after evacuation of the space between the element and the passage surface. Preferably, the lining element and the powdered metal would be of the same metallurgical composition.

With respect to the drawings, and for the present to FIG. 1 thereof, there is shown a valve, designated generally as 10, having a valve body 12, bonnet 14, cap 16, valve stem 18 and valve wheel 20. To the valve body 12, bonnet 14 is connected as by welding or bolting (not shown). The bonnet 14 has a threaded hub 22 onto which the cap 16 is threaded. The valve stem 18, which is connected to the valve wheel 20, is adapted to upon the turning of wheel 20 slide within passage 24 of bonnet 14 and passage 26 of the valve body 12. These passages 24 and 26 are connecting upon assembly of the valve as shown in FIG. 1. In addition, these passages are subjected to fluid flow through the valve and thus in instances where this fluid is of a highly corrosive nature the valve is, in accordance with the invention, clad with a layer of powdered metal alloy resistant to this corrosive media, which is identified as 28. The clad layer 28 is, of course, of a composition different than that of the remainder of the valve body which may be of a less corrosion resistant and therefore less expensive material.

Although in accordance with the method of the invention both the valve body and bonnet would be made by the identical processing steps, FIG. 2 of the drawings shows only the valve bonnet 14 and the invention will be described with respect to this component. The assembly as shown in FIG. 2 comprises a body portion 15 of the valve bonnet 14, which body portion may be of an alloy that is not resistant to the corrosive media with which the bonnet is subjected during use. Within the body 15 there is provided, as by a machining operation, internal cavity 24. It is this internal cavity which when the bonnet is in assembly as shown in FIG. 1 is subjected to the corrosive media during use. Confined along the walls of cavity 24 is powdered metal alloy 28, which is of a metallurgical composition resistant to the corrosive fluid to which the passage is subjected during use. Solid lining elements 30 and 32 are provided along the portions of the walls of the cavity 24 of relatively thick cross section. The powder and lining elements are confined and sealed against the atmosphere by a sleeve 34 and annular cap 36. A stem 38 permits evacuation of the powder in the space between the sleeve and the walls of the passage 24. After evacuation the stem 38 may be crimped to seal the powder and lining element against the atmosphere during hot isostatic compacting. Hot isostatic compacting may be performed in a conventional gas pressure vessel, commonly termed an "autoclave". Heating to hot isostatic compacting temperature may be performed either within the autoclave or outside the autoclave to suitable compacting temperature whereupon the assembly would be placed within the autoclave for compacting. During compacting the powdered metal is densified and bonded against the walls of the cavity or passage 24 as are the solid lining elements 30 and 32. The metallurgical composition of the powder 28 and lining elements 30 and 32 are identical so that after hot isostatic compacting there is an integral cladding of the same composition on the walls of passage 24. After compacting and prior to assembly of the bonnet 14 in a valve assembly a hole would be drilled through the body 15 and cladding portion constituting the lining element 32 to accommodate the valve stem.

In accordance with the invention, hot isostatic compacting is performed in the conventional manner with temperatures on the order of 1700° to 2200° F., and with pressures on the order of 12,000 to 15,000 psi.

Although the invention has been described in relation to the production of a valve component, it is to be understood that it can be used in any application wherein it is desired to clad an internal passage or cavity with a metal or alloy that is dissimilar to the metal or alloy of the cavity surface to be clad.

By the use of a solid lining element in combination with the powdered metal at the areas of cladding of relatively thick cross sectional area, the required tolerances may be readily obtained at these areas while eliminating or minimizing the final finishing operations after cladding and prior to use of the component in a valve assembly. Specifically, during hot-isostatic compacting, the surface of the article being clad in contact with the powder is deformed toward the powder. The thicker the powder layer the greater will be the potential for deformation. By using a solid lining element, in accordance with the practice of the invention, the thickness of the powder layer is decreased to in turn decrease the potential for deformation of the article surface in contact with the powder.

I claim:

1. A method for producing an alloy article having an internal passage or cavity clad with an alloy that is dissimilar in metallurgical composition to the alloy of the clad surface, said method comprising confining a lining of prealloyed powdered metal on a surface of said internal passage, said powdered metal being of an alloy different in metallurgical composition from the alloy of said surface, providing a solid lining element contiguous with at least a portion of said lining of powdered metal with said powdered metal lining being between said surface of said internal passage and said lining element, said powdered metal and solid lining element being confined within a space defined by a surface of said internal passage and a sleeve inserted within said passage in spaced-apart relation to said surface of said internal passage, said lining element being of an alloy having a metallurgical composition identical to that of said powdered metal, heating said powdered metal and solid lining element, evacuating said space to subatmospheric pressure and hot-isostatic pressing said powdered metal to densify and bond said powdered metal and said solid lining element to said internal passage of said alloy article to clad said internal passage with an alloy that is dissimilar in metallurgical composition to the alloy of said clad surface.

2. The method of claim 1 wherein the alloy article is a valve or valve component.

3. The method of claim 1 wherein said sleeve is made from mild carbon steel.

* * * * *